United States Patent
Carroll

(10) Patent No.: US 7,071,827 B2
(45) Date of Patent: Jul. 4, 2006

(54) APPARATUS AND SYSTEM FOR IDENTIFYING INFANT-MOTHER MATCH

(75) Inventor: Craig Carroll, Concord, NH (US)

(73) Assignee: Secure Care Products, Inc., Concord, NH (US)

(*) Notice: Subject to any disclaimer, the term of this patent is extended or adjusted under 35 U.S.C. 154(b) by 0 days.

(21) Appl. No.: 09/883,703

(22) Filed: Jun. 18, 2001

(65) Prior Publication Data

US 2002/0021214 A1 Feb. 21, 2002

Related U.S. Application Data

(60) Provisional application No. 60/212,432, filed on Jun. 16, 2000.

(51) Int. Cl.
*G08B 23/00* (2006.01)

(52) U.S. Cl. .............. 340/573.1; 340/573.4; 340/691.1; 340/691.5; 340/692; 340/332; 340/539.12; 340/572.1; 340/568.1

(58) Field of Classification Search ........... 340/573.1, 340/573.4, 691.1, 691.4, 691.5, 692, 326, 340/331, 332, 539, 5.8, 572.1, 568.1, 825.49, 340/539.12

See application file for complete search history.

(56) References Cited

U.S. PATENT DOCUMENTS

| | | | | |
|---|---|---|---|---|
| 4,471,345 A | 9/1984 | Barrett, Jr. | | 340/572 |
| 4,482,890 A | 11/1984 | Forbes et al. | | 340/556 |
| 4,853,692 A * | 8/1989 | Wolk et al. | | 340/573.1 |
| 4,885,571 A | 12/1989 | Pauley et al. | | 340/573 |
| 4,918,432 A | 4/1990 | Pauley et al. | | 340/573 |
| 4,924,211 A * | 5/1990 | Davies | | 340/573.4 |
| 4,952,913 A | 8/1990 | Pauley et al. | | 340/573 |
| 5,006,830 A * | 4/1991 | Merritt | | 340/573.1 |
| 5,014,040 A | 5/1991 | Weaver et al. | | 340/572 |
| 5,086,290 A * | 2/1992 | Murray et al. | | 340/539.13 |
| 5,196,825 A | 3/1993 | Young | | 340/539 |
| 5,218,344 A | 6/1993 | Ricketts | | |
| 5,245,317 A | 9/1993 | Chidley et al. | | 340/571 |
| 5,285,194 A | 2/1994 | Ferguson | | 340/572 |
| 5,317,309 A * | 5/1994 | Vercellotti et al. | | 340/825.54 |
| 5,374,921 A | 12/1994 | Martin et al. | | 340/539 |
| 5,440,559 A | 8/1995 | Gaskill | | |
| 5,457,440 A | 10/1995 | Daddono | | |
| 5,512,879 A * | 4/1996 | Stokes | | 340/573 |
| 5,543,780 A | 8/1996 | McAuley et al. | | 340/573 |
| 5,608,382 A * | 3/1997 | Webb et al. | | 340/573.4 |
| 5,621,384 A * | 4/1997 | Crimmins et al. | | 340/539 |
| 6,144,304 A * | 11/2000 | Webb | | 340/573.4 |
| 6,211,790 B1 * | 4/2001 | Radomsky et al. | | 340/573.4 |

FOREIGN PATENT DOCUMENTS

WO    WO 99 65004 A    12/1999

* cited by examiner

*Primary Examiner*—Tai T. Nguyen
(74) *Attorney, Agent, or Firm*—Hayes Soloway P.C.

(57) ABSTRACT

An identification system including at least one transmitter configured to transmit a signal comprising an associated identification code. A receiver is configured to receive the signal and establish a comparison indication based on comparison of the identification code with a reference code. The comparison indication is positive if the identification code matches the reference code. A method of transmitting an identification code, receiving the identification code, and comparing it to a reference code is also provided.

14 Claims, 3 Drawing Sheets

APPARATUS AND SYSTEM FOR IDENTIFYING INFANT-MOTHER MATCH

CROSS-REFERENCE TO RELATED APPLICATIONS

The present application claims the benefit of U.S. provisional application No. 60/212,432 filed Jun. 16, 2000, the teachings of which are incorporated herein by reference.

FIELD OF THE INVENTION

This invention relates to a system for verifying that mobile (wireless) components have been delivered to a proper predetermined location. The invention will be described with particular reference to a hospital setting, e.g. to verify that an infant is brought to the appropriate mother, the invention is not so limited, and utilities are contemplated.

BACKGROUND OF THE INVENTION

Typically, when a pregnant woman arrives at a hospital in anticipation of childbirth, the woman is fitted with an identification band, e.g., a bracelet, which includes pertinent information such as her name, her assigned room, and, perhaps, any relevant medical information. The identification band is typically constructed of a plastic material, or a plastic reinforced or coated paper on which information has been computer printed or hand written.

Immediately after an infant is born, the infant too is fitted with an identification band, e.g., an anklet. The infant's anklet typically contains the same basic information as the bracelet typically worn by the mother. In the hours, or days, subsequent to birth, the infant will be transported from various places in the hospital to the mother's room many times. The trips will be toward such ends as feedings and familiarization.

Each time the newborn infant is brought to the mother's room, it must be verified that the infant has been brought to the proper mother. Verification of the infant/mother match is typically accomplished by comparing the information on the infant's anklet to that on the mother's bracelet. Unfortunately, this method of verifying an infant/mother match suffers from two possible problems. First, in a large hospital, in which the maternity ward may span several floors or wings that may simultaneously accommodate a large number of mothers and infants, there is a possibility that two or more mothers/infants may have similar names resulting in an infant being brought to a woman that is not its mother. When the problem is realized and corrected, there is bound to be a degree of emotional stress or trauma, especially during the highly emotional time surrounding childbirth.

The second problem is that, even in smaller hospitals, because verification of an infant/mother match is typically carried out by a side-by-side comparison of the mother's bracelet and the infant's anklet, if the wrong infant is brought to a mother the infant is already in the mother's presence, perhaps even her arms, before the error is realized. As discussed above, such an occurrence is very likely to result in a great deal of anxiety, and potentially undermine the parents faith in the hospital, therein provoking even greater anxiety.

It is therefore desirable to have a system that overcomes the deficiencies of the prior art by allowing verification of a mother/infant match that is independent of name, and will allow for verification before the infant is brought into the mother's presence.

BRIEF SUMMARY OF THE INVENTION

An identification system consistent with the invention includes at least one transmitter configured to transmit a signal including an associated identification code, and at least one receiver. The receiver is configured to receive the transmitted signal and establish a comparison of the identification code with a reference code. The identification system may be further configured to provide a positive indication if the identification code matches the reference code, and a negative indication if the code does not match.

An apparatus consistent with the invention to provide an infant-mother match indication is also provided where the transmitted identification code is associated with one infant. A method of identifying a mobile component match with a receiver consistent with the invention includes: transmitting an identification code; receiving the identification code; and comparing the identification code with a reference code to establish a comparison indication.

BRIEF DESCRIPTION OF THE DRAWINGS

For a better understanding of the present invention, together with other objects, features and advantages, reference should be made to the following detailed description which should be read in conjunction with the following figures wherein like numerals represent like parts.

DETAILED DESCRIPTION

According to one aspect of the invention, an identification apparatus and system verifies that one of a plurality of mobile components has been transported to one of a plurality of receiver locations. In the interest of clarity, the description and illustrations herein pertain to an embodiment in which an apparatus and system consistent with the present invention is utilized to verify that an infant has been brought to the appropriate mother in a hospital setting. However, the inventive concept has many utilities. For example, the inventive concept may be used in a storage warehouse setting or moving van to assist movers in sorting and delivering goods to their proper storage room or destination. It also may be used to verify certain materials are located near their proper gate in an airport setting, or any other similar situation.

Figure 1:
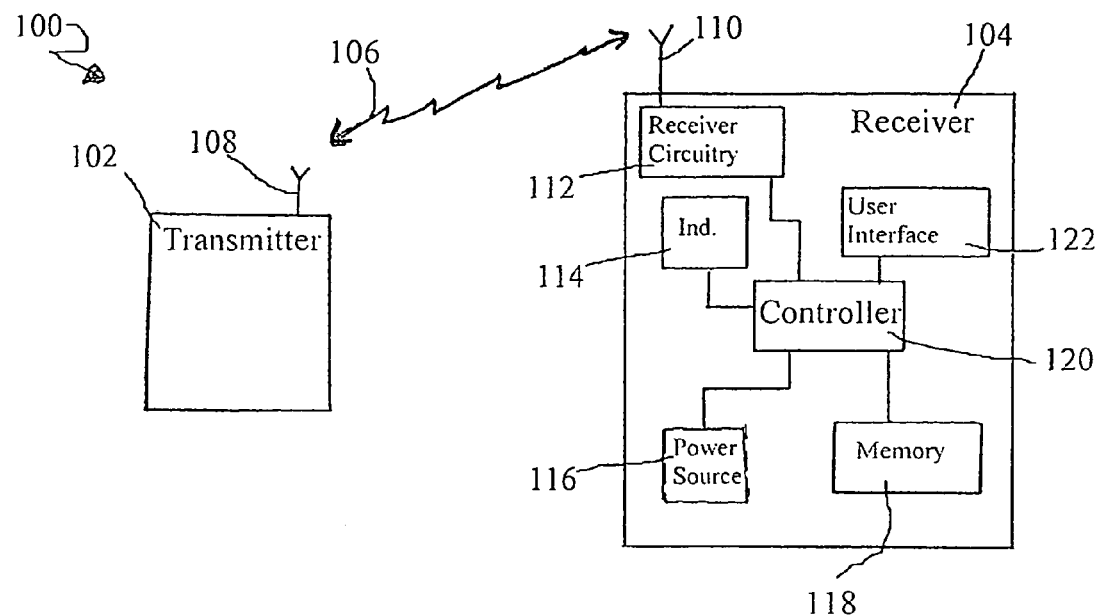
FIG. 1 is a block diagram of an exemplary transmitter-receiver pair consistent with the present invention.

Turning to FIG. 1, a simplified exemplary block diagram of a transmitter-receiver pair 100 consistent with the present invention is illustrated. For clarity, only one transmitter-receiver pair 100 is illustrated, but those skilled in the art will recognize that a plurality of transmitter-receiver pairs or a plurality of transmitters and a matched receiver, or a plurality of receivers and a matched transmitter, may be utilized in a system consistent with the present invention. The transmitter 102 may be affixed to an identification band, e.g. an anklet, which in turn may be affixed to an infant. The infant, and hence the transmitter 102 are typically mobile as the infant is moved about in a hospital setting. Advantageously, a receiver 104, on the other hand, may be fixed to a predetermined location near a mother's room, e.g. adjacent the door frame, or carried on the mother's identification band. Those skilled in the art will also recognize that the transmitter and receiver may be reversed so that the receiver is coupled to the infant and the transmitter is fixed to a predetermined location or on the mother's identification band.

As will later be more fully described, each transmitter 102 may be configured to transmit a separate identification code. Each receiver 104 may be programmed to respond positively to one identification code at a time that matches an associated transmitter 102 with an associated receiver 104. In such a way, an infant with an associated transmitter 102 will trigger a positive match indication from only one associated receiver 104 that is located nearby the appropriate mother. Advantageously, this provides a method to ensure hospital personnel are matching the appropriate infant with the appropriate mother.

The transmitter 102 may also include an antenna 108 for transmitting radio waves 106 to the receiver 104. Various commercially available power sources and internal transmitter circuitry that may be utilized in a transmitter consistent with the present invention.

A receiver 104 consistent with the present invention may be configured to communicate with a plurality of transmitters 102. Advantageously, communication may take place via radio waves 106 at a predetermined frequency to permit communication there between with minimal interference to and from other RF equipment.

The receiver may include an antenna 110, receiver circuitry 112, an indicator 114, a user interface 122, a controller 120, memory 118, and a power source 116. The antenna 110 receives radio waves 106 transmitted by a plurality of transmitters. The user interface 122 indicates to users various conditions of the receiver such as a match with a particular transmitter, no match, or whether the receiver is functioning properly. A user interface may include visual displays such as detailed in FIG. 2 or any other indicating means such as audio signals. The user interface 122 permits a user to input data to the receiver such as programming the receiver to store a certain reference code.

The controller 120 controls operation of all the various receiver components. The memory 118, e.g., EEPROM, may be utilized to store various data, such as a respective reference code pertaining to a particular mother located in a room next to the receiver. The power source 116 may be a stand-alone external central power source that provides power to a plurality of receivers, an internal stand-alone power source, e.g. a battery, or the power source may be obtained from hard wiring the receiver 104 to the building's existing electrical distribution system. Finally, the power source 116 may also be obtained from any combination of the above.

In one exemplary central power source embodiment, a central power source, e.g., a battery, provides power supply voltage ranging from 7.5 volts to 15 volts DC to approximately twenty receivers. Given the supply voltage and capacity of the power source, a maximum wire length of 450 feet end to end of 20 AWG stranded shielded two-conductor wire may be utilized. Of course, the maximum number of receivers per central power source and corresponding wire lengths and sizes will depend on the particulars of the chosen central power source and expected voltage drops between the power source and associated receivers.

Figure 2:
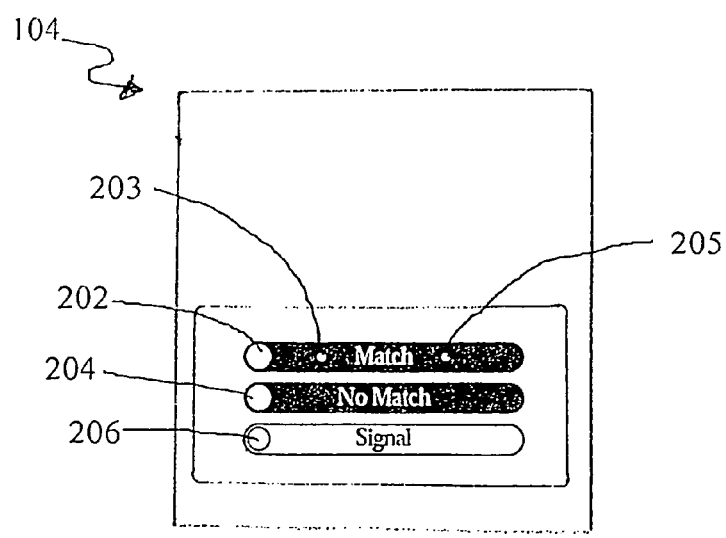
FIG. 2 is an exemplary user interface and indicator for use with a receiver consistent with the present invention.

Turning to FIG. 2, an exemplary user interface and indicator on an exemplary receiver 104 is illustrated. Of course, a variety of user interfaces and indicators that may be utilized without departing from the scope of the present invention. In addition, such user interface and indicators may be located remotely from the receiver 104. The exemplary indicator 114 includes a "Match" display 202, a "No Match" display 204, and a "Signal" display 206.

The "Signal" display 206 may flash intermittently when the receiver is sampling a signal from a transmitter. Once the signal is sampled, the controller 120 may decide if the received identification code matches the stored reference code in memory 118. The controller 120 will trigger illumination of the "Match" display 202 for a predetermined time if a positive response or match is detected. Alternatively, the controller 120 will trigger illumination of the "No Match" display 204 for a predetermined time if a negative response or no match is detected. In addition, the indicator may be configured to indicate via a flashing "Match" display that the receiver is operating properly, e.g., the power source 116 is adequate and the controller 120 is operational.

The user interface 122 may include program switches 203, 205 to program the receiver to store in memory 118 the identification code from an associated transmitter within range of the receiver. In this instance, a transmitter is first brought within range of the receiver, wherein a no match signal should initially be triggered. The two program switches 203, 205 are then pressed and held. After a predetermined time, e.g. three seconds, the receiver unit will attempt to read the transmitter code. The receiver may also read the transmitter identification code multiple times. During this time a programming mode display may be activated. This may include the "Match" 202 and the "No Match" display 204 flashing alternately until an identification code is successfully read or until a certain amount of time, e.g. 12 seconds, has elapsed.

Upon successful programming a "Match" display 202 may be indicated. If programming is not successful in twelve seconds the receiver unit may time-out and return to its normal operation mode. Programming may then be re-attempted after releasing the programming switches 203, 205.

Figure 3:
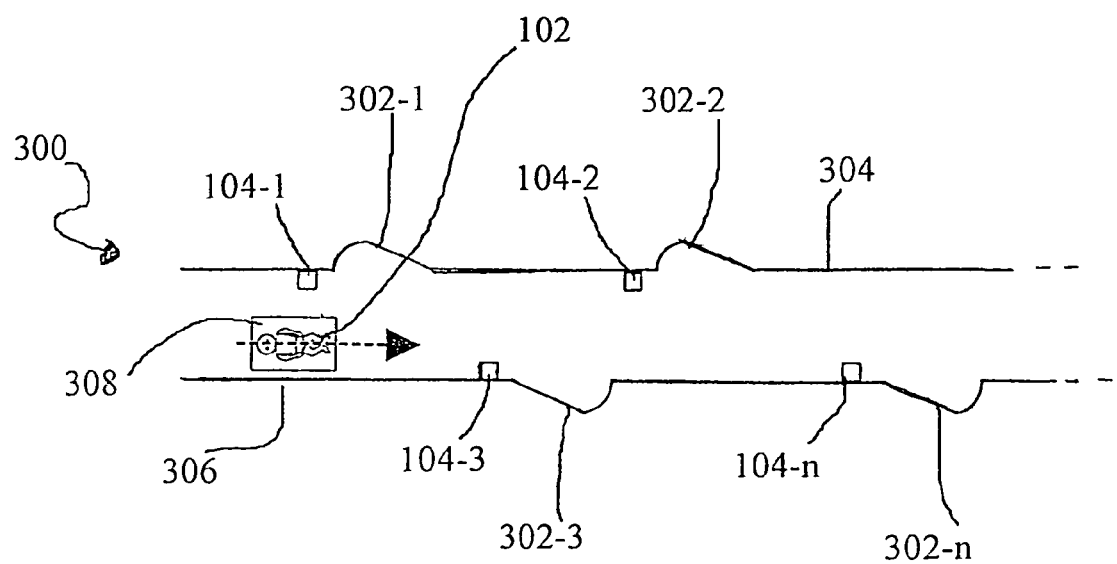
FIG. 3 is a plan view of an exemplary hallway illustrating locations outside of associated rooms for a plurality of receivers consistent with the present invention.

Turning to FIG. 3, a plan view of an exemplary partial hallway 300 is illustrated. A plurality of receivers consistent with the present invention 104-1, 104-2, 104-3, 104-n may be located outside a plurality of doors 302-1, 302-2, 302-3, 302-n. The receivers may be affixed to walls 304, 306. Given a standard hospital bassinet height of approximately 3.5 feet, the receivers 104-1, 104-2, 104-3, 104-n should be located at a corresponding height for best communication.

Other factors such as interfering equipment, physical limitations, and user convenience will also dictate optimal mounting height considerations. Advantageously, the exterior location of the receivers relative to respective hospital rooms in the exemplary mounting locations of FIG. 3 enables hospital personnel to verify an infant match with a mother before entering the room. In other words, an infant on an infant bassinet 308 having a transmitter 102 coupled to the infant located within range of the proper associated receiver will trigger the receiver to display a confirming "Match" display 202 signal.

Figure 4:
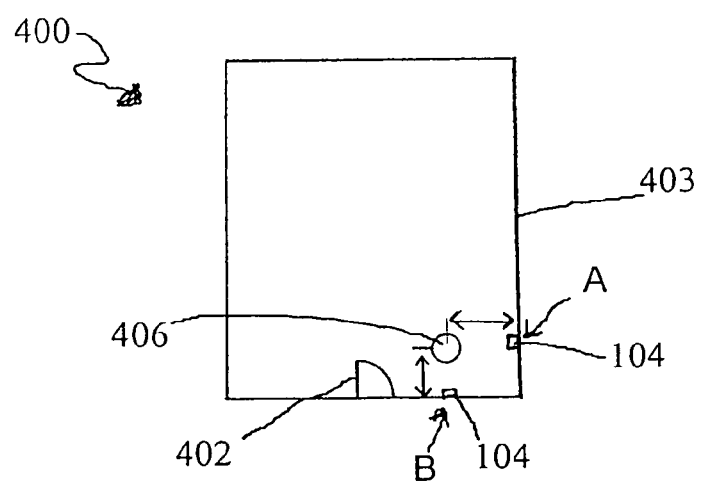
FIG. 4 is a plan view of a room illustrating locations for mounting receivers consistent with the present invention inside of a room.

Turning to FIG. 4, an alternate exemplary receiver location scheme that locates the receiver 104 inside a hospital room 400 is illustrated. The receiver may be located in position A or position B in an interior corner of a room if only one mother is typically in such room. If two or more mothers are in a single room, an associated number of receivers may be placed on an interior wall corresponding to each mother's bed in that room, or on the mother's identification band.

The receiver may be mounted at a height to match the height of a standard infant bassinet or approximately 3.5 feet. To ensure that the infant, and thereby the transmitter 102, is positioned close enough to the receiver to allow proper communication of the identification code, a decal 406 or marking may be disposed on the floor just inside the door 402 a suitable range from the receiver 104. In an exemplary 10'×12' room, the decal 406 may be affixed to the floor two feet from a sidewall as measured at a right angle from the sidewall.

An infant with an associated transmitter 102 may be held stationary or may be moving relative to a receiver 104. The infant may be positioned in any variety of positions relative to the receiver as long as he is positioned within range of the transmitter-receiver pair. Reliable communication may occur at a variety of transmitter-receiver distances, e.g. by adjusting transmitter and receiver power levels, depending on the particular characteristics of an installation.

Figure 5:
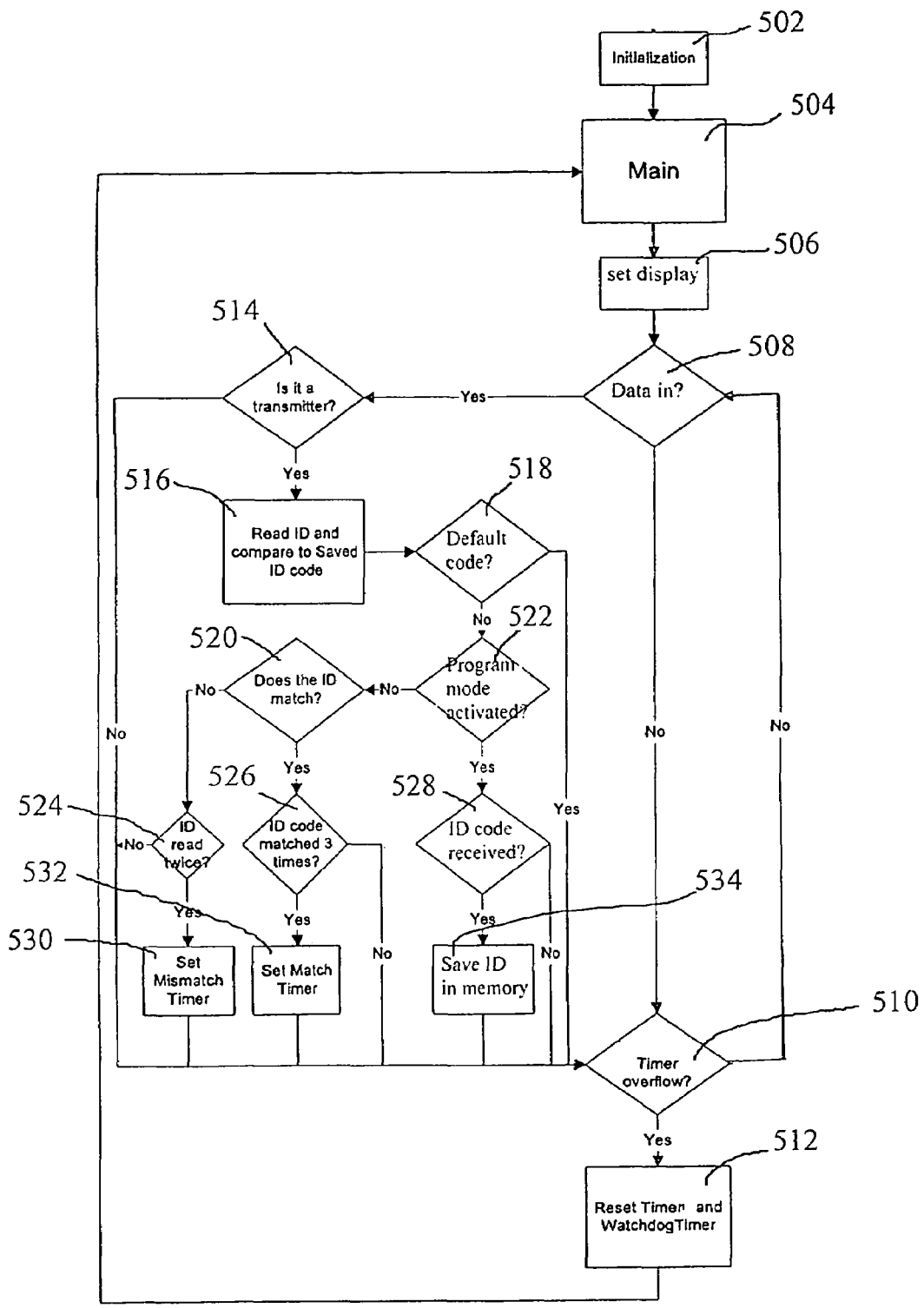
FIG. 5 is a flow chart illustrating the operation of an exemplary system consistent with the present invention.

The controller 120 may control operation of an apparatus and system consistent with the present invention. The controller may be programmed to function in a manner consistent with the flow chart shown in FIG. 5. According to the illustrated flow chart, the system must first initialize 502 certain variables, e.g., display variables, from which point it proceeds to run the system main routine 504. The first step 506 of the main routine 504 is to set displays 506. In this set displays 506 step, based on various instructions received from the system, different display modes are triggered. For example, a system error message may be triggered if two or more identification codes are received. A receiver operational message may be triggered if no transmitter is within receiving range and the receiver is functioning properly. A "Match" display 202 and "No Match" display 204 may be triggered if a transmitter identification code matches or does not match a reference code stored in the receiver's memory. The "Match" display may be set to last for a certain amount of time, e.g. 5 seconds, while the "No Match" display may be set to last for a different amount of time, e.g. 10 seconds. A programming message display may also be triggered if the unit is being programmed to store a certain identification code from a certain transmitter. After these displays have been set, the system determines if data is coming in 508.

If there is no incoming data 508, the system continuously loops back to monitor whether there is any incoming data until a certain time in the timer overflow subroutine 510 is reached. The measured time in such a timer overflow subroutine 510 may be between approximately 50 ms and 100 ms depending on system characteristics. If this certain time is reached, the timer is reset 512, and the system loops back to the beginning of the main routine 504. In this way, the main routine will be run each time that the chosen time for the timer overflow subroutine is reached.

If the system determines that data is coming in, it next makes a determination 514 as to whether the data is originating from a transmitter. If the incoming data is not from a transmitter, the system loops back to the timer overflow subroutine 510.

If the incoming data is from a transmitter, the system reads the identification code and compares it to the saved identification code or reference code 516. Once the identification code has been read, the system evaluates the code to determine if it is a default code 518. If the code is a default code, the system loops to the timer overflow subroutine 510. If the code is not a default code, it is determined whether the programming mode is activated 522. In an exemplary embodiment, depressing the programming push buttons 203, 205 for a predetermined time, e.g. three seconds, may activate the programming mode.

If the program mode has been activated, it is determined if an identification code has been received from an associated transmitter 528. In an exemplary embodiment, the identification code may need to be received multiple times, e.g. three times, before an identification code is considered successfully received. Once this occurs, the received identification code is then stored in memory 534 and the system then loops to the timer overflow subroutine 510. If an identification code is not successfully received, the system proceeds directly to the timer overflow subroutine.

If the programming mode has not been activated, the system determines if the identification code from the transmitter matches the reference code stored in the receiver's memory 520. If the identification code matches, the match timer is set 532 and then the system loops to the timer overflow subroutine 510. This then triggers a proper signal to the set display 506 step to provide a match indication. In an exemplary indicator, a "Match" display 202 may be triggered to remain on for a set amount of time. An additional step 526 may be utilized which reads the identification code multiple times, e.g. three times, to provide added reliability.

If the identification code does not match the reference code, the mismatch timer 530 is set and again the system loops to the timer overflow subroutine 510. This then triggers a proper signal to the set display 506 step to provide a no match indication. In an exemplary indicator, a "No Match" display 204 may be triggered to remain on for a set amount of time. Similar to the match process, an additional step 524 may be utilized which reads the identification code multiple times, e.g. two times, to provide added reliability.

The operation of the present invention depends upon the determination of a match between a transmitter identification code and a receiver. Preferably the receiver units are programmable, such that any receiver can be programmed to return a positive response, signaling a match, to any transmitter identification code.

The embodiments that have been described herein, however, are but some of the several which utilize this invention and are set forth here by way of illustration but not of limitation. For example, the identification code may be set by a transmitter affixed to an identification band on the mother. Thus, if the mother is moved to another hospital room, the identification code travels with the mother, so that the receiver mounted adjacent the door to the mother's new room is automatically calibrated with the new identification code. In yet another embodiment of the invention, the mother wears a transmitter, while the receiver including associated circuitry and displays are carried on the band on the infant. And, in the case of multiple births, each infant may be supplied with a similarly coded transmitter or receiver. Also, the display may be audible as well as visual, or audible and visual. Also, the invention advantageously may be employed for ensuring that medicine intended for a particular patient is delivered to the intended patient, by providing, for example, a receiver on the medicine cup programmed to respond positively to the identification code on a transmitter on the patient's identification band. In like manner, the portals to procedure rooms may be provided with receivers programmed to the identification codes of the several patients scheduled for procedures in that room that day. Thus, a patient awaiting a CAT scan won't accidentally be wheeled into an operating room. Yet other embodiments may be made without departing materially from the spirit and scope of the invention. For example, goods or cargo being moved could be supplied with transmitters all tuned to a matched receiver which may be placed adjacent the frame of the door to the van, or adjacent the frame of the door of the dwelling or other destination location, and provide an audible and/or visual signal in the event a mismatched item is removed from the van.

What is claimed is:

1. An identification system comprising:
    a plurality of transmitters, each said transmitter being configured to transmit only a single unique signal comprising a unique identification code corresponding only to said transmitter, and
    a plurality of receivers, each said receiver being configured to receive only one said signal whereby to establish a comparison indication based on comparison of said unique identification code with a unique reference code;
    wherein each said receiver is programmed to respond positively to said unique identification code that matches said receiver with only one said transmitter, and
    wherein each said receiver comprises programmable memory for storing said unique reference code, and for holding information regarding the location of said receiver, and each said receiver includes a user interface configured to program said memory.

2. The identification system of claim 1, wherein said comparison indication is positive if said unique identification code matches said unique reference code.

3. The identification system of claim 1, wherein said comparison indication is negative if said unique identification code does not match said unique reference code.

4. The identification system of claim 1, wherein each of said receivers further comprises a controller and an indicator, said controller being configured to communicate with said indicator, wherein said indicator provides said comparison indication based on comparison of said unique identification code with said unique reference code stored in said memory.

5. The identification system of claim 1, wherein at least one of said receivers is mounted to a fixed structure.

6. The identification system of claim 5, wherein said fixed structure is a wall.

7. The identification system of claim 1, wherein said unique reference code is the same as said unique identification code.

8. AN apparatus for identifying an infant-mother match from amongst several matches, comprising:
    a plurality of transmitters, each said transmitter being configured to transmit only a single unique signal comprising a unique associated identification code for a specific infant, and
    a plurality of receivers, each said receiver being configured to receive only one said signal whereby to establish a comparison indication based on comparison of said unique identification code with a unique reference code;
    wherein each said receiver is programmed to respond positively to said unique identification code that matches said receiver with only one said transmitter, and
    wherein each said receiver comprises programmable memory for storing said unique reference code, and for holding information regarding the location of said receiver, and each said receiver includes a user interface configured to program said memory.

9. The apparatus of claim 8, wherein at least one of said transmitters is coupled to an identification band, which identification band is in turn coupled to said associated infant.

10. The apparatus of claim 8, wherein said comparison indication is positive if said unique identification code for said associated infant matches said unique reference code for a mother of said infant.

11. The apparatus of claim 8, wherein said comparison indication is negative if said unique identification code for said associated infant does not match said unique reference code for a mother of said infant.

12. The apparatus of claim 8, wherein each of said receivers further comprises a controller and an indicator, said controller configured to communicate with said indicator, wherein said indicator provides said comparison indication based on comparison of said identification code with said reference code stored in said memory.

13. The apparatus of claim 8, wherein at least one of said receivers is mounted to a fixed structure.

14. The apparatus of claim 13, wherein said fixed structure is a wall.

* * * * *